(12) United States Patent
Terauchi

(10) Patent No.: US 11,375,127 B2
(45) Date of Patent: Jun. 28, 2022

(54) IMAGE-CAPTURING DEVICE, IMAGE CAPTURING METHOD, IMAGE-CAPTURING SYSTEM, AND ELECTRONIC DEVICE

(71) Applicant: Ricoh Company, Ltd., Tokyo (JP)

(72) Inventor: Masakazu Terauchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 17 days.

(21) Appl. No.: 17/159,223

(22) Filed: Jan. 27, 2021

(65) Prior Publication Data

US 2021/0289142 A1 Sep. 16, 2021

(30) Foreign Application Priority Data

Mar. 12, 2020 (JP) .............................. JP2020-042788
Aug. 19, 2020 (JP) .............................. JP2020-138437

(51) Int. Cl.
*H04N 5/232* (2006.01)
*G06T 7/73* (2017.01)
*G06T 7/246* (2017.01)

(52) U.S. Cl.
CPC .......... *H04N 5/23299* (2018.08); *G06T 7/73* (2017.01); *H04N 5/23229* (2013.01); *G06T 2207/30181* (2013.01)

(58) Field of Classification Search
CPC .......... H04N 5/23299; H04N 5/23245; H04N 5/23218; H04N 5/23229; G06T 2207/10016; G06T 2207/10032; G06T 7/246; G06T 7/73; G06T 2207/30181
See application file for complete search history.

(56) References Cited

U.S. PATENT DOCUMENTS

| | | | |
|---|---|---|---|
| 2009/0225155 A1* | 9/2009 | Hirotani | H04N 7/183 342/357.34 |
| 2011/0293139 A1* | 12/2011 | Ohta | G01S 3/7867 382/103 |
| 2015/0116538 A1 | 4/2015 | Terauchi et al. | |
| 2016/0277713 A1* | 9/2016 | Tamiola | G06T 7/60 |
| 2019/0043211 A1* | 2/2019 | Bertrand | H04N 5/23216 |
| 2019/0045146 A1 | 2/2019 | Terauchi et al. | |
| 2019/0191082 A1 | 6/2019 | Uehara et al. | |
| 2019/0296062 A1 | 9/2019 | Terauchi et al. | |
| 2019/0297242 A1 | 9/2019 | Terauchi et al. | |

FOREIGN PATENT DOCUMENTS

| | | |
|---|---|---|
| JP | 2000-165896 | 6/2000 |
| JP | 2012-005112 | 1/2012 |
| JP | 2012-010324 | 1/2012 |

* cited by examiner

*Primary Examiner* — Christopher K Peterson
(74) *Attorney, Agent, or Firm* — Xsensus LLP

(57) ABSTRACT

An image-capturing device includes an image-capturing optical system; an image sensor; and processing circuitry configured to: control the image-capturing optical system to capture one or more preliminary images of an object to be tracked; analyze the one or more preliminary images; calculate tracking-control information using results of the analysis; and adjust at least one of the image-capturing optical system and the image sensor with movement of the object, in accordance with the tracking-control information to capture an image of the object that is being tracked.

17 Claims, 13 Drawing Sheets

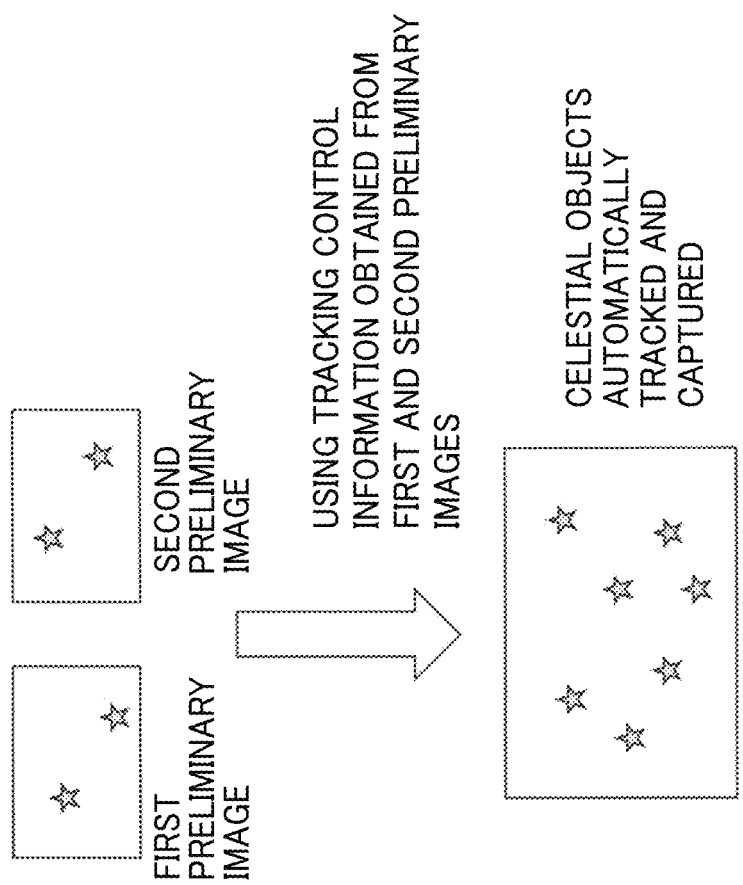
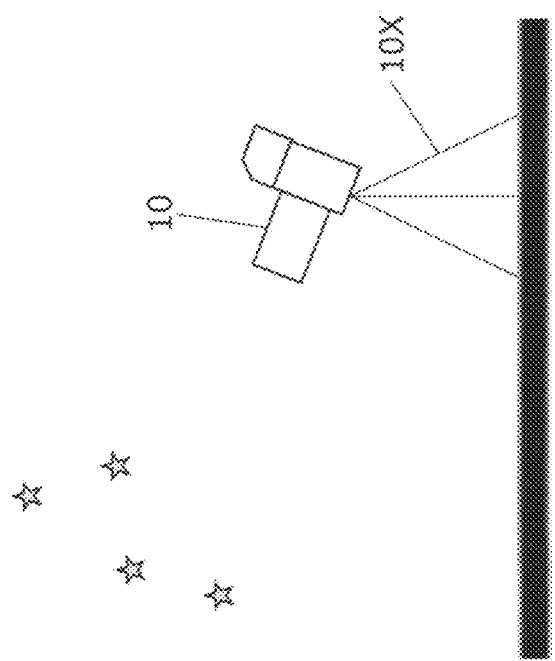

FIRST PRELIMINARY IMAGE (t1)

SECOND PRELIMINARY IMAGE (t2)

AMOUNT OF MOVEMENT OF CELESTIAL OBJECT OBTAINED FROM DIFFERENCE BETWEEN FIRST PRELIMINARY IMAGE AND SECOND PRELIMINARY IMAGE

CALCULATION AREAS

SEARCH AREA R
SEARCH IMAGE T
Mmax
SAD CALCULATION

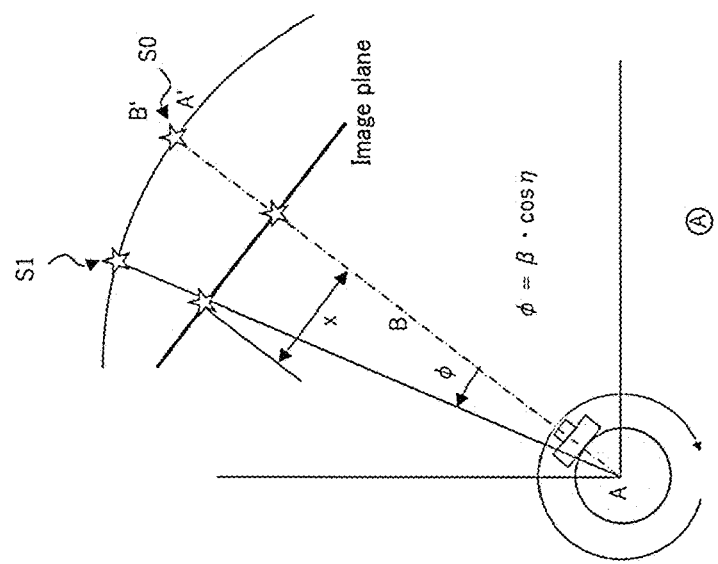
FIG. 9B
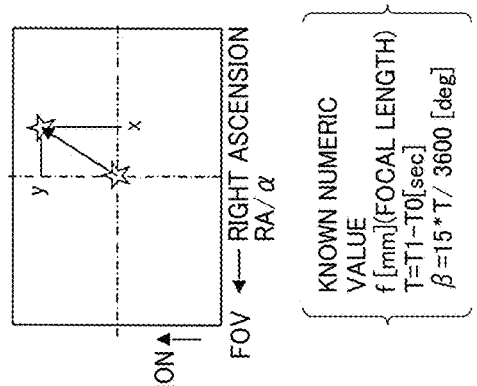
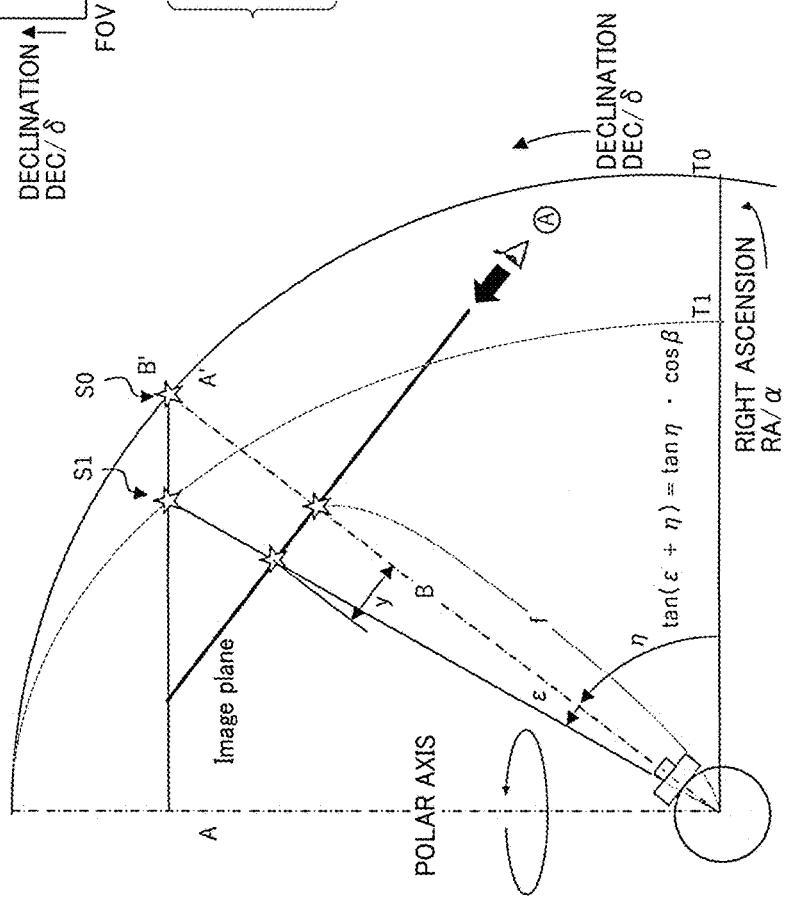
FIG. 9A

IMAGE-CAPTURING DEVICE, IMAGE CAPTURING METHOD, IMAGE-CAPTURING SYSTEM, AND ELECTRONIC DEVICE

CROSS-REFERENCE TO RELATED APPLICATIONS

This patent application is based on and claims priority pursuant to 35 U.S.C. § 119(a) to Japanese Patent Application No. 2020-042788, filed on Mar. 12, 2020 and Japanese Patent Application No. 2020-138437, filed on Aug. 19, 2020 in the Japan Patent Office, the entire disclosure of which is hereby incorporated by reference herein.

BACKGROUND

Technical Field

Embodiments of the present disclosure relate to an image-capturing device, an image capturing method, an image-capturing system, and an electronic device.

Related Art

There is known a method of automatically tracking and capturing a celestial object virtually moving relative to the image-capturing device because of its diurnal motion. The method involves rendering an image of the celestial object formed by the image-capturing optical system of the image-capturing device stationary with respect to a certain imaging area of the image sensor during capturing of an image.

SUMMARY

In one aspect of this disclosure, there is described an image-capturing device including an image-capturing optical system, an image sensor, and processing circuitry configured to: control the image-capturing optical system to capture one or more preliminary images of an object to be tracked; analyze the one or more preliminary images; calculate tracking-control information using results of the analysis; and adjust at least one of the image-capturing optical system and the image sensor with movement of the object, in accordance with the tracking-control information to capture an image of the object that is being tracked.

In another aspect of this disclosure, there is disclosed an image-capturing method including controlling an image-capturing optical system of an image-capturing device to capture one or more preliminary images of an object to be tracked; analyzing the one or more preliminary images captured by the image-capturing optical system; calculating tracking-control information using results of the analyzing; and adjusting at least one of the image-capturing optical system and an image sensor of the image-capturing device with movement of the object, in accordance with the tracking-control information to capture an image of the object that is being tracked.

In even another aspect of this disclosure, there is disclosed an image-capturing system including an image-capturing device including: an image-capturing optical system configured to capture one or more preliminary images; an image sensor; and processing circuitry configured to: control the image-capturing system to capture one or more preliminary images of an object to be tracked; analyze the one or more preliminary images; and calculate tracking-control information using results of the analysis; and a stand mounted with and communicably connected to the image-capturing device, the stand configured to move in accordance with the tracking-control information. The image-capturing system captures an image of the object that is being tracked.

In still another aspect of this disclosure, an electronic device includes processing circuitry configured to: analyze one or more preliminary images of an object to be tracked, captured by an image-capturing device; and calculate tracking-control information using results of the analysis, used to adjust at least one of an image-capturing optical system and an image sensor of the image-capturing device with movement of the object.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIGS. 3A and 3B are illustrations for describing a manner in which a preliminary image is captured, according to an embodiment;

FIGS. 9A and 9B are another set of conceptual diagrams illustrating the movement of a celestial object;

Figure 1:
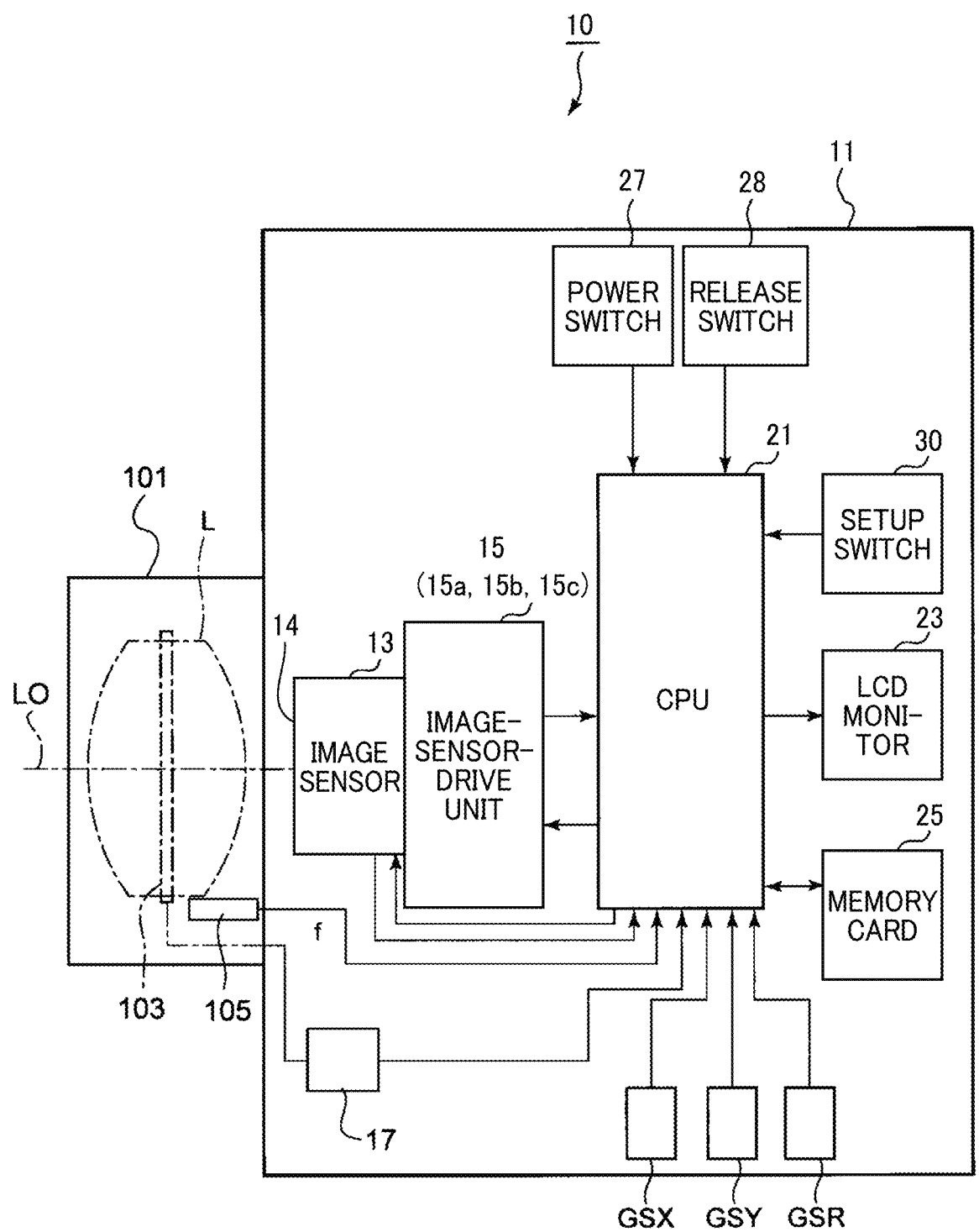
FIG. 1 is a block diagram of a hardware configuration of a digital camera according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The embodiments of the present disclosure provide a simple image-capturing device capable of automatically tracking of an object and capturing of an image of the object in a desirable manner, and an image capturing method, an image-capturing system, and an electronic device to achieves the same capability.

FIG. 1 is a block diagram of the hardware configuration of a digital camera 10 (an image-capturing device) according to an embodiment of the present disclosure. The image capturing method of the digital camera 10 involves predetermined processes, which are implemented by the components of the digital camera 10.

The digital camera 10 includes a camera body 11 and an image-capturing lens 101 (an image-capturing optical system L). The camera body 11 includes an image sensor 13 in the rear of the image-capturing optical system L. The optical axis LO of the image-capturing optical system L is orthogonal to an imaging surface 14 of the image sensor 13.

The image sensor 13 is mounted on an image-sensor-drive unit 15.

The image-sensor-drive unit 15 has a fixed stage 15a, a movable stage 15b movable relative to the fixed stage 15a, and an electromagnetic circuit 15c to move the movable stage 15b relative to the fixed stage 15a. The image sensor 13 is held by the movable stage 15b. The image sensor 13 on the movable stage 15b is driven by the CPU 21 to move in parallel to a desired direction orthogonal to the optical axis LO at a desired velocity, and also controlled to rotate about an axis parallel to the optical axis LO (i.e., an instant center at any position within a plane orthogonal to the optical axis LO) at a desired rotation speed.

Such an image-sensor-drive unit 15 is known as, for example, an image-sensor-drive unit of an image blur correction device for a camera in a comparative example.

The image-capturing optical system L of the image-capturing lens 101 includes a plurality of lenses and a stop 103. The f number (i.e., open and close degree) of the stop 103 is controlled by an aperture-stop control device 17 of the camera body 11. The image-capturing lens 101 includes a focal-length sensor 105 to detect a focal length (i.e., focal-length information f, which is also referred to as information on focal length of the image-capturing optical system L) of the image-capturing optical system L.

The focal-length information f of the image-capturing optical system L detected by the focal-length sensor 105 is input to the CPU 21 of the camera body 11.

Alternatively, information regarding a focal length may be input as the focal-length information f by using, for example, a setup switch 30. At this time, the setting of the focal-length information f can be displayed on a liquid crystal display (LCD) monitor 23.

The CPU 21 in the camera body 11 controls the entire functional operations of the digital camera 10. The CPU 21 adjusts the image sensor 13 via the image-sensor-drive unit 15, and processes a signal of an image captured by the image sensor 13, causing an image of the processed signal to appear on the LCD monitor 23 while writing the image into a memory card 25.

When the image-sensor-drive unit 15 is used as a vibration-isolating unit, a gyroscope sensor in the X direction (GSX), a gyroscope sensor in the Y direction (GSY), and a gyroscope sensor in a rotation direction (GSR) are used to detect vibrations applied to the digital camera 10. The signals of the vibrations detected by the GSX, the GSY, and the GSR are input to the CPU 21.

The camera body 11 includes switches including a power switch 27, a release switch 28, and a setup switch 30. The CPU 21 executes control in accordance with ON/OFF state of these switches 27, 28, and 30.

In response to ON/OFF of the power switch 27, for example, the CPU 21 switches on or off power supply from a battery, and in response to ON/OFF of the release switch 28, the CPU 21 executes a focal-point adjustment, a photometric measurement, and an image-capturing process.

In the embodiments of the present disclosure, the setup switch 30 serves as a switch to switch on or off an automatic celestial-object tracking and capturing mode (i.e., a tracking and capturing operation or mode) to be described below.

In addition, the LCD monitor 23 serves as a display to display whether the automatic celestial-object tracking and capturing mode (i.e., the tracking and capturing mode) is ON or OFF.

The digital camera 10 according to an embodiment has an automatic celestial-object tracking and capturing mode (i.e., a tracking and capturing operation or mode) for capturing an image of a celestial object (an object to be tracked) virtually moving relative to the digital camera 10 because of its diurnal motion. In the automatic celestial-object tracking and capturing mode, an image of a celestial object (a celestial-object image) captured by the image-capturing optical system L is formed to remain stationary with respect to a predetermined area of the imaging surface 14 of the image sensor 13 in the digital camera 10, by moving at least one of the celestial-object image and the predetermined area of the imaging surface 14 of the image sensor 13 relative to the digital camera 10 during the capturing of an image.

In a typical method of estimating the movement of a celestial object using a preliminarily captured image, the trail of the celestial object in the preliminarily captured image is taken as an arc, and the central position of the arc is calculated. Using a circle including the arc, the image sensor is adjusted to simulate the trail of the celestial object.

Such a method involving calculating the trail as a circle is simple, but fails to track and capture a celestial object at higher accuracy. In calculating the trail of a celestial object as an arc, the arc might be elliptic, might have a different curvature, or might be a straight line with an infinite curvature depending on a position on the screen. This is because the movement of celestial objects is more complicated, and estimating the trail as a simple circle fails to achieve the intended performance.

In other words, as a typical lens has a projection system (i.e., the central projection) that satisfies y=f tan θ, when the diurnal motion of a celestial object is captured, the trail of the celestial object on the image sensor appears to form an elliptical curve with a different curvature depending on the position within the screen.

Such a curvature of the curve of the trail differs depending on the focal length for the declination of a celestial object to be captured, and approximation with the circular motion to track a target celestial object has a limit. Such a typical method has difficulties in tracking a target celestial object with higher accuracy.

Further, acquiring (calculating) the tracking-control information for adjusting the image sensor uses latitude information and more preferably uses tilt information in addition to the latitude information. The latitude information includes, for example, information regarding declination, and the tilt information includes, for example, information regarding rotation of a camera (i.e., rotation about the declination).

In a comparative example, sensors such as a global positioning system (GPS) unit, an azimuth sensor, and an acceleration sensor are provided to obtain such latitude information and tilt information.

The camera according to the comparative example, which is provided with such sensors, becomes large, complex, and costly.

Further, such sensors fail to measure and obtain the latitude information and tilt information with accuracy sufficient to achieve its intended performance, and might cause trouble with the tracking and capturing of a target object using a lens with a long focal length.

To avoid such issues, the embodiments of the present disclosure achieve the digital camera 10 with a simple structure and capable of automatically tracking a target object and capturing an image of the target object in a better manner to achieve the intended performance.

Unlike the comparative example that estimates the circular motion or linear motion of a target celestial object from a preliminarily captured image, an embodiment of the present disclosure preliminarily captures an image of a celestial object, and based on the movement of the celestial object from the preliminary image, obtains information on the status of the camera, measuring the actual movement of the celestial object by using the information on the status of the camera. In accordance with the movement of the celestial object, the image sensor is adjusted to enable higher accurate tracking of a target celestial object using a lens with a long focal length.

Figure 2:
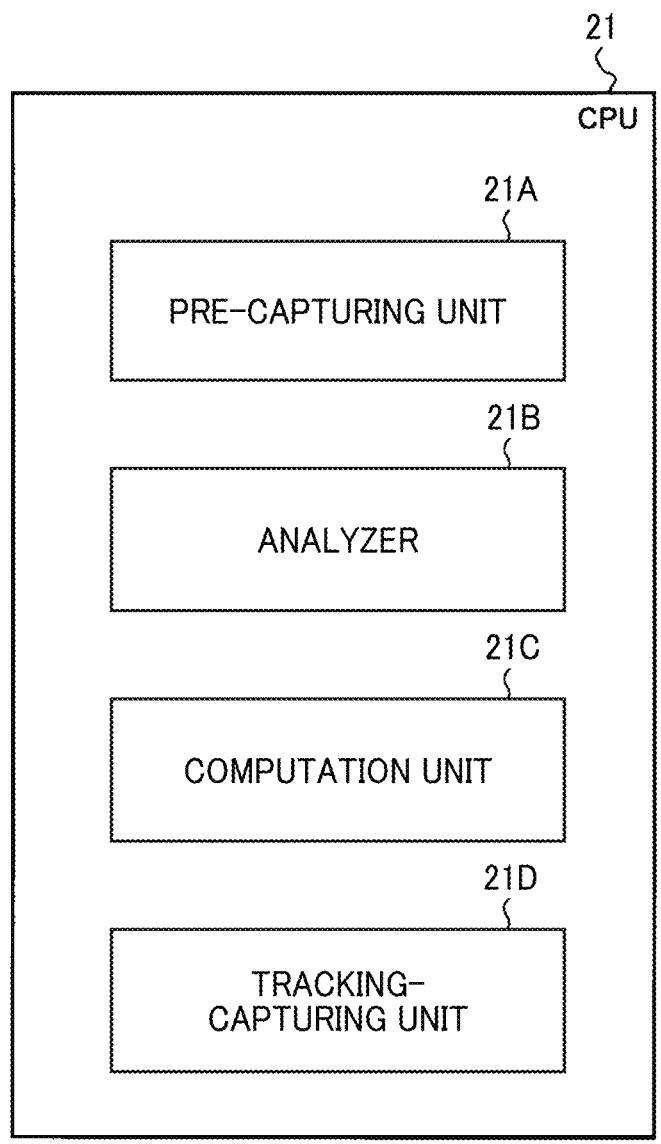
FIG. 2 is a block diagram of a functional configuration of a central processing unit (CPU) according to an embodiment.

FIG. 2 is a block diagram of a functional configuration of the CPU 21. The CPU 21 includes a pre-capturing unit 21A, an analyzer 21B, a computation unit 21C, and a tracking-capturing unit 21D, which implement the capabilities of the digital camera 10 as described above.

The pre-capturing unit 21A preliminarily captures an image (also referred to as a preliminary image) of a celestial object to be tracked (i.e., a target object or an object to be tracked) during nonoperation of the image sensor 13, using the image-sensor-drive unit 15.

More specifically, the pre-capturing unit 21A acquires a preliminary image in cooperation with the image-capturing optical system L and the image sensor 13. In other words, the image-capturing optical system L and the image sensor 13 implement the pre-capturing unit 21A under the control of the CPU 21. For example, the CPU 21 controls the image-capturing optical system L to capture one or more preliminary images.

In case of capturing a plurality of preliminary images by the pre-capturing unit 21A, the exposure time may be the same for each of the preliminary images.

FIGS. 3A and 3B are illustrations for describing a manner in which a preliminary image is captured, according to an embodiment. In the example of FIGS. 3A and 3B, two preliminary images are captured, and this is only one example. In any example, one or more (e.g., one, three, or more) images are preliminarily captured.

In some examples, a plurality of images is preliminarily captured with short exposure time to acquire a plurality of preliminary images. In some other examples, one preliminary image is captured with a long exposure time, and a plurality of images is further obtained from the one preliminary image to include a starting point, an endpoint, and a midpoint of the one preliminarily captured image.

Such a case of preliminarily capturing one image with a long exposure time and further obtaining a plurality of preliminary images including the starting point, the endpoint, and the midpoint of the one preliminary image may be interpreted merely as the case of preliminarily capturing a plurality of images (i.e., acquiring a plurality of preliminary images).

As illustrated in FIG. 3A, the digital camera 10 is mounted on a stand 10X, such as a tripod, with the digital camera 10 facing a target celestial object to be tracked. A celestial object may be automatically tracked and captured using a device called an equatorial mount that moves a camera with the movement of the celestial object (i.e., the earth's rotation). However, such an equatorial mount is costly, heavy, and not easy to handle.

In an embodiment of the present disclosure, the digital camera 10 is mounted on the stand 10X, facing a target celestial object, and the image sensor 13 is adjusted to automatically track and capture the target celestial object.

FIG. 3B is an illustration of a plurality of preliminarily captured images: a first preliminary image and a second preliminary image, from which information (i.e., tracking-control information) to be used to automatically track and capture a target celestial object is obtained.

The plurality of preliminarily captured images may be abandoned (dropped) at any time when the plurality of preliminarily captured images is no longer needed, including the start timing and the end timing of calculation of the tracking-control information.

The analyzer 21B analyzes the amount of movement of the target celestial object in the preliminary images captured by the pre-capturing unit 21A.

The analyzer 21B calculates information on the status of the digital camera 10 using the following: the preliminary images captured by the pre-capturing unit 21A; the focal-length information f of the image-capturing optical system L detected by the focal-length sensor 105 or input through the setup switch 30; and the time interval between the image-capturing times of the plurality of preliminary images by the pre-capturing unit 21A or the exposure time when one preliminary image is captured by pre-capturing unit 21A.

The information on the status of the digital camera 10 includes at least one of the latitude information and the tilt information.

The latitude information represents the location of the digital camera 10, including a latitude or a declination of the celestial object that the digital camera 10 is facing.

The tilt information represents an angle formed by the right ascension and the horizontal axis or the vertical axis of the digital camera 10, for example.

In this case, the focal-length information f includes information representing the principal point of a lens, such as a principal-plane distance or a principal-point distance, or any information equivalent to the focal-length information f.

Figure 4A:
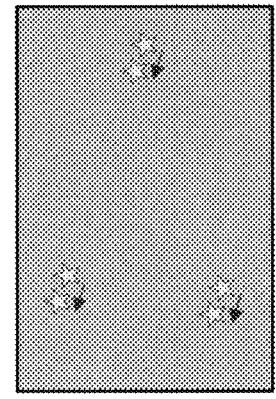
FIGS. 4A, 4B, and 4C are illustrations for describing an analysis of the amount of movement of a celestial object in the preliminary image, according to an embodiment.
Figure 4B:
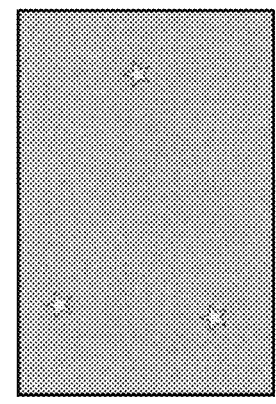
Figure 4C:
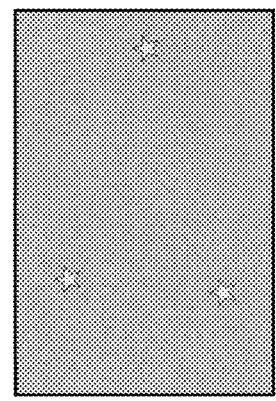

FIGS. 4A, 4B, and 4C are illustrations for describing analysis of the amount of a celestial object in the preliminary images, according to an embodiment. A first preliminary image of a celestial object is captured at time t1 (FIG. 4A), and a second preliminary image of the celestial object is captured at time t2. Using the first preliminary image at time t1 and the second preliminary image at time t2, the amount of movement of the celestial object is calculated (FIG. 4C).

As illustrated in FIGS. 4A to 4C, with the passage of time from the time t1 of the first preliminary image to time t2 of the second preliminary image, the celestial object has moved (flown) to the upper left relative to the original position in the first preliminary image.

The tracking-control information used to automatically track and capture a celestial object is obtained using following four pieces of information:

(1) information regarding the focal-length information f of the image-capturing optical system L or information equivalent to the information;

(2) time interval between the image-capturing times of a plurality of preliminarily captured images or the exposure time when only one image is preliminarily captured;

(3) latitude information including the latitude or declination of the celestial object that the digital camera 10 is facing; and (4) tilt information (i.e., information indicating an angle formed by the right ascension and the horizontal axis or the vertical axis of the digital camera 10.

The items (1) and (2) are known information obtained through the lens communication or the timer in the digital camera 10. The items (3) and (4) are obtained using the amount of movement of the celestial object captured in the preliminary images.

For example, two preliminary images of a celestial object are captured at different times, and the amount of movement of the celestial object and the trail of the celestial object are obtained from the two images preliminarily captured at different times. Using the amount of movement and trail of the celestial object, the amount of movement between two points is obtained. In some other examples, one image is preliminarily captured, and the trail of the celestial object during the exposure time is analyzed to obtain the amount of movement of the celestial object during the exposure time. Using the focal length (the above-mentioned item (1)) and the amount of movement of the celestial object obtained from the images captured at the different times, the above-mentioned items (3) and (4) are obtained.

As described above, the analyzer 21B obtains at least one of the latitude information and the tilt information using the preliminary images.

There is a certain latitude in adopting which type of method of calculating the amount of movement of a celestial object between a plurality of preliminary images, from among various types of methods. In an embodiment, sum of absolute difference (SAD) is employed, and the case in which the SAD is employed is described below. The SAD is a measure of similarity between images using the sum of absolute values of differences between pixel values in the images.

Figure 5A:
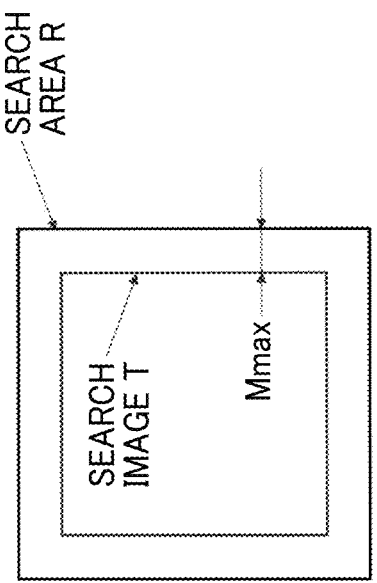
FIGS. 5A and 5B are illustrations for describing calculation of the amount of movement of a celestial object between a plurality of preliminary images, using sum of absolute difference (SAD), according to an embodiment.
Figure 5B:
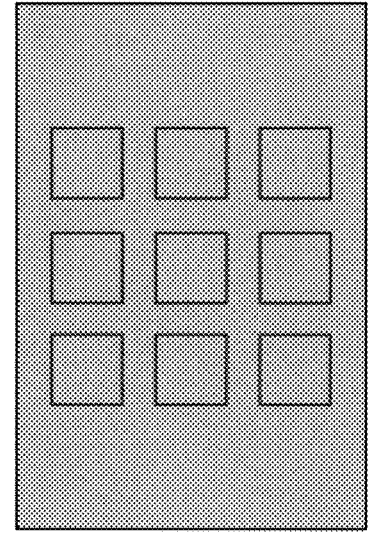

FIGS. 5A and 5B are illustrations for describing the calculation of the amount of movement of a celestial object between a plurality of preliminary images using the SAD. FIG. 5A is an illustration of a total of nine areas (3 vertical×3 horizontal) to be calculated using the SAD, and FIG. 5B is an enlarged view of each of the areas to be calculated in FIG. 5A.

Each area to be calculated, which is referred to as a calculation area, includes a relatively large rectangular search area R and a relatively small rectangular search image T inside the search area R.

A maximum clearance Mmax is defined between the search area R and the search image T.

When f denotes a focal length, and θ denotes an angle of rotation of a celestial object during the exposure time interval (i.e., the time interval between the image-capturing times of a plurality of preliminary images), Mmax is given by $$M\max = f\tan(\tan^{-1} y + \theta) - y$$

where y is a distance between the edge of the search area R and the center of the screen.

The SAD performs calculation on representative areas (i.e., each calculation area) within the screen, instead of the entire screen, so as to save the calculation cost. In addition, each calculation area to be searched to obtain the amount of movement of a celestial object has a relatively small size.

The amount of movement of each celestial object varies according to the position in the screen (e.g., a position closer to the center or a position closer to the perimeter of the screen). As the direction of movement of each celestial object also differs depending on the position within the screen, a motion vector is to be obtained from each of the divided areas of the screen even if the calculation cost is low.

The search area R is set within the range up to a maximum amount of movement of a celestial object, which can be obtained from the focal length and the time interval between the image-capturing times of a plurality of images of the celestial objects. The values calculated by the SAD is given by the following formula:

$$SAD(dx, dy) = \sum_{x=0}^{w-1} \sum_{y=0}^{h-1} |R(dx+x, dy+y) - T(x, y)|$$

The pixel with the smallest value among the calculation results of the SAD corresponds to the position obtained as the result, and the position is calculated in sub-pixel units.

Figure 6A:
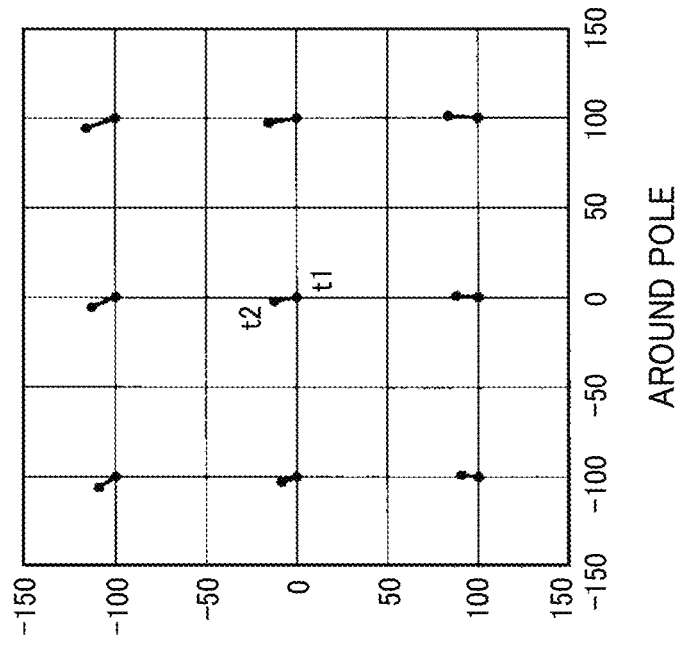
FIGS. 6A and 6B are graphs presenting the results of calculation of the amount of movement of the celestial objects in the plurality of preliminary images, according to an embodiment.
Figure 6B:
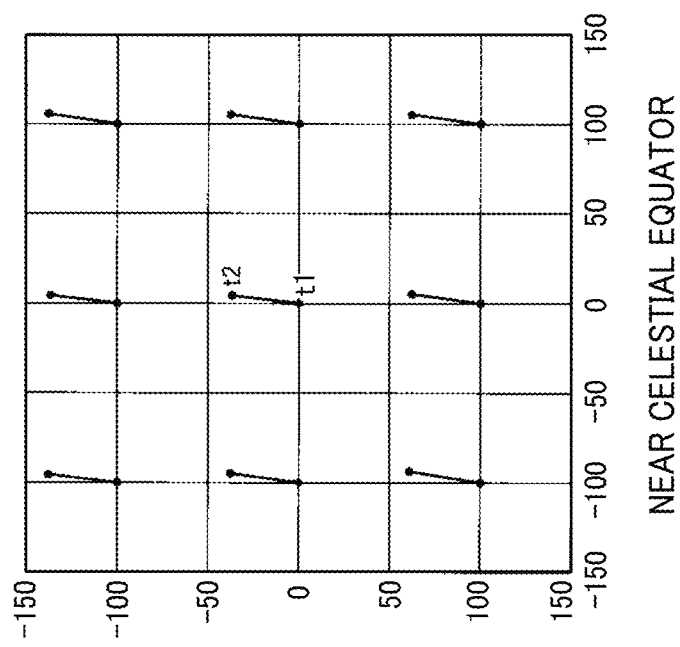

FIGS. 6A and 6B are graphs presenting the results of calculation of the amount of movement of the celestial objects in the plurality of preliminary images, according to an embodiment.

The calculated amount of movement of a celestial object is represented by a line segment or a vector defined by a set of two points in each area. When two or more images are preliminarily captured and used for calculation, any combination of two points are used. For example, when three preliminary images are used and points P0, P1, and P2 are available, each combination of two points such as P0 and P1, P0 and P2, and P1 and P2 is used.

Figure 7A:
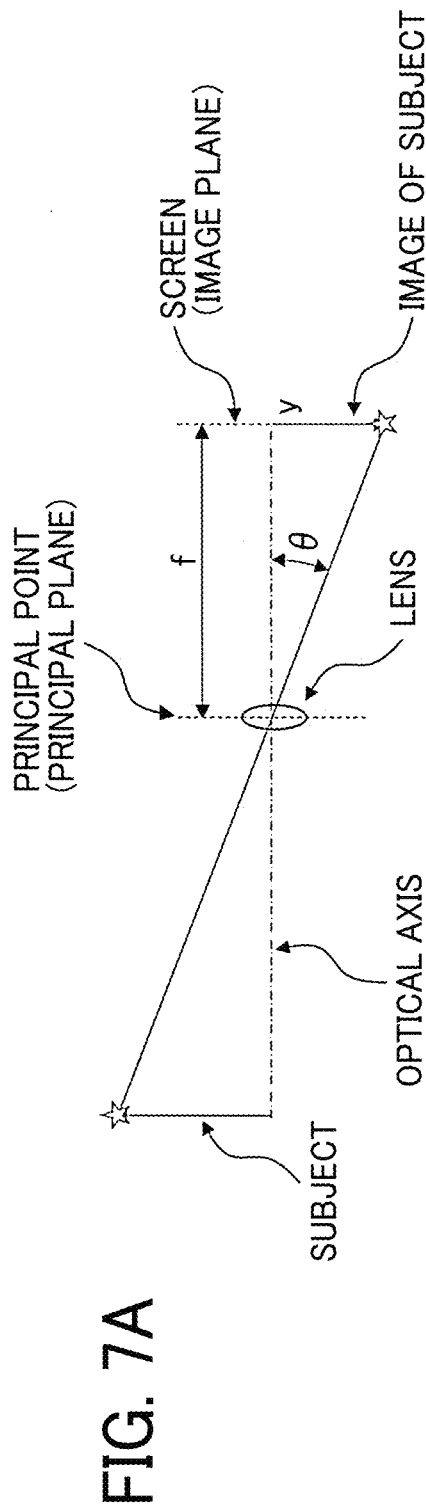
FIGS. 7A and 7B are illustrations of image formation of a lens, according to an embodiment.
Figure 7B:
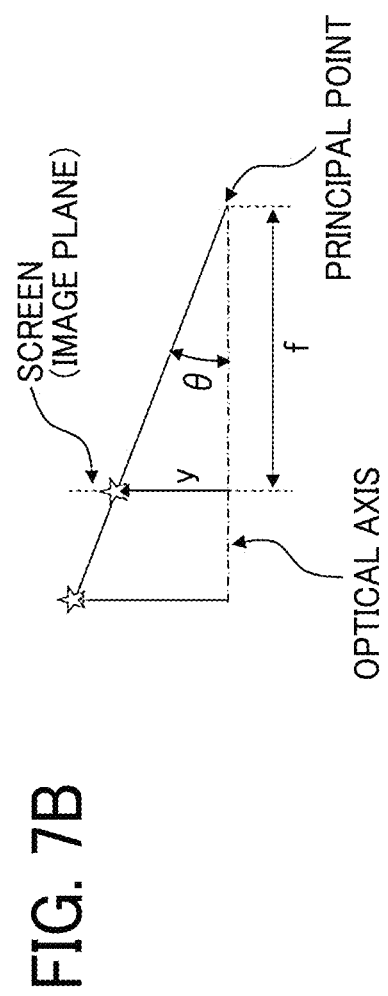

FIGS. 7A and 7B are illustrations for describing the image formation of a lens (i.e, projection of a typical lens) having the central projection where y=f tan θ is established, according to an embodiment.

In this case, f denotes a focal length of the lens, y denotes an image height of a subject, and θ is the angle formed by the optical axis and the image height. Further, as the subject is a celestial object and can be captured as a point, the image height y corresponds to the position at which an image is formed (i.e., a distance from the optical axis), and the angle θ corresponds to an angle formed by the optical axis and a virtual line connecting the celestial object and the principal point of the lens.

When the picture in FIG. 7A is folded back at the principal point (principal plane) of the lens, the picture in FIG. 7B is obtained. This means that the pictures in FIGS. 7A and 8B are similar to each other.

FIG. 9A is an illustration for describing in detail FIGS. 7A and 7B by applying FIGS. 7A and 7B to FIG. 8.

The line segment B in FIG. 9A corresponds to the optical axis, c in FIG. 9A corresponds to the angle θ in FIGS. 7A and 7B.

Hereinafter, the movement of a celestial object on the screen is described with reference to FIGS. 8 to 10, assuming that an image of the celestial object is captured with the optical system in FIGS. 7A and 7B.

Figure 8:
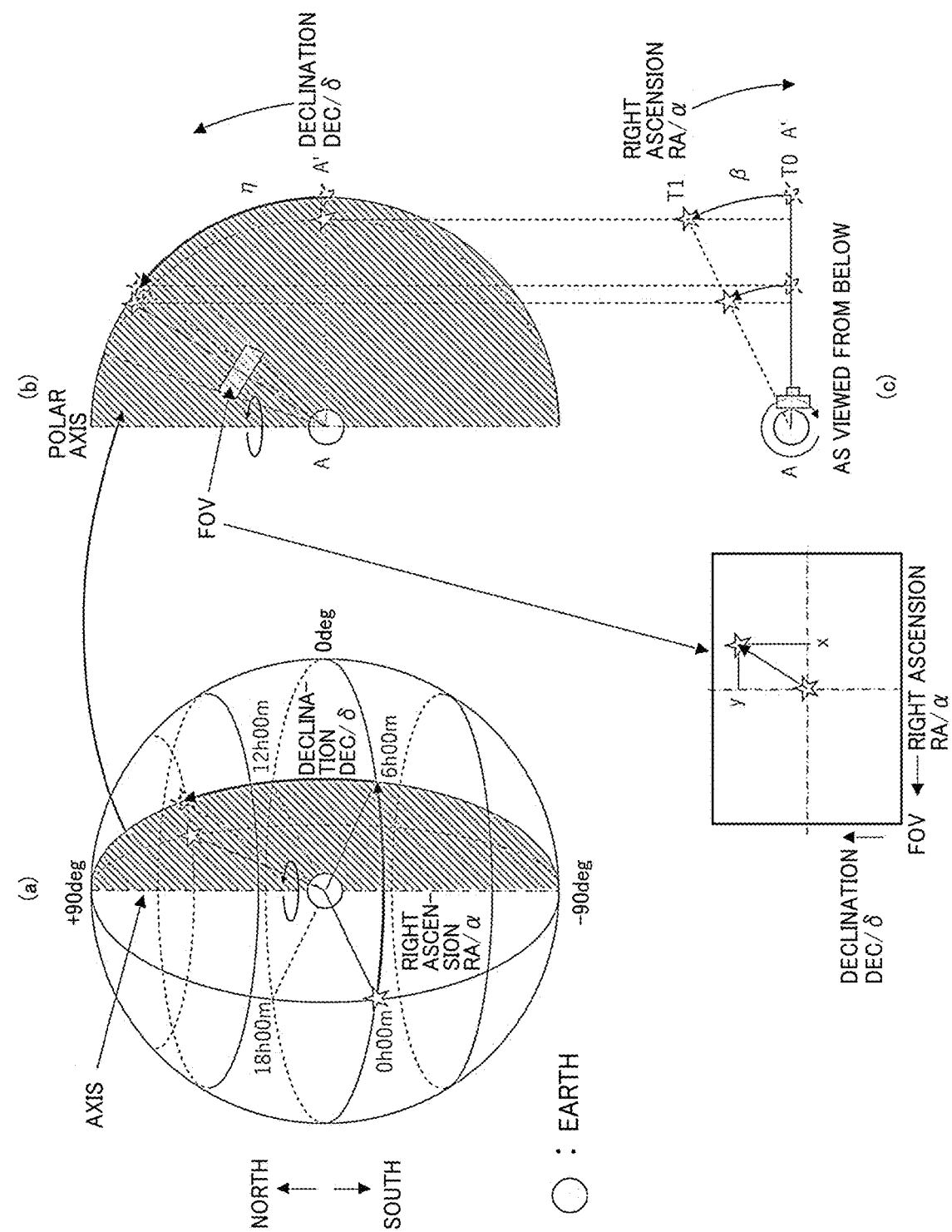
FIG. 8 is a conceptual diagram of the movement of celestial objects, according to an embodiment of the present disclosure.

FIG. 8 is a conceptual diagram of the movement of celestial objects when the celestial objects are observed from the earth.

FIG. 8(a) is an illustration of the movement of the celestial objects with the rotation of the earth about the axis.

FIG. 8(b) is an enlarged view of the shaded part corresponding to the movement of the celestial objects during the time T1 (i.e., from time T0 to time T1) in FIG. 8(a) where η0 indicates the direction of declination (i.e., the direction of the optical axis) in which the camera is facing.

FIG. 8(c) is a view of FIG. 8(b) when viewed from below (i.e., the south pole) where β indicates the amount of rotation of the celestial objects (i.e., hour angle of right ascension) during the time T1 from the time T0 to the time T1.

As illustrated in FIGS. 8(a) to 8(c), the right ascension (RA) indicated by a and the declination (DEC) indicated by δ change with the movement of the celestial objects during the time T1 (from time T0 to the time T1) in the photographic field of view (FOV).

FIGS. 9A and 9B are illustration of another concept of the movement of the celestial objects, illustrating FIGS. 8(b) and 8(c) in detail. In FIGS. 9A and 9B, S0 indicates the position of a celestial object at the time T0, and S1 indicates the position of the same celestial object at the time T1. An image plane represents the celestial object captured by the camera and projected at the position corresponding to the position in an image to be formed.

FIG. 9A represents a position S0 of a celestial object captured with the camera (i.e., the digital camera 10) facing in the direction of declination 11 at the time T0, and a position S1 of the same celestial object when the time T1 has passed from the time T0. As the camera follows the rotation of the earth, the camera remains facing the original position S0 when the celestial object has moved to the position S1 from the original position S0.

As is observed from FIG. 9B (i.e., the view when the image plane is viewed from below, or the lower part of the image), an angle φ is the amount of movement of the celestial object during the time from the time T0 to the time T1.

The angle φ, which is a virtual angle in the image plane formed by the camera facing in the direction of declination is given by β cos η (φ=β cos η) where β is the amount of movement of the celestial object during the exposure time T.

Assuming that the amount of movement of the celestial object is given by x and y obtained from two preliminary images captured at the time T0 and the time T1, ε and φ in FIGS. 9A and 9B are given by a tan(y/f) (i.e., ε=a tan(y/f)) and a tan(x/f) (i.e., φ=a tan(x/f)), respectively.

Further, the following expression is established:

tan(ε+η)=tan η×cos β.

In the embodiments of the present disclosure, f, x, y, and β are known values, and ε and φ are calculated from these known values although η is an unknown quantity. However, η is obtained by substituting the values of f, x, y, β, ε, and φ into the above-described expression.

At this time, a plurality of values η are obtained, and one value η (i.e., the direction of declination in which the camera is facing) is uniquely determined using the information on the positive or negative within the screen. Using the information on the direction of declination in which the camera is facing, the focal length, and the rotation of the camera and the celestial object, the celestial object can be tracked.

Figure 10:
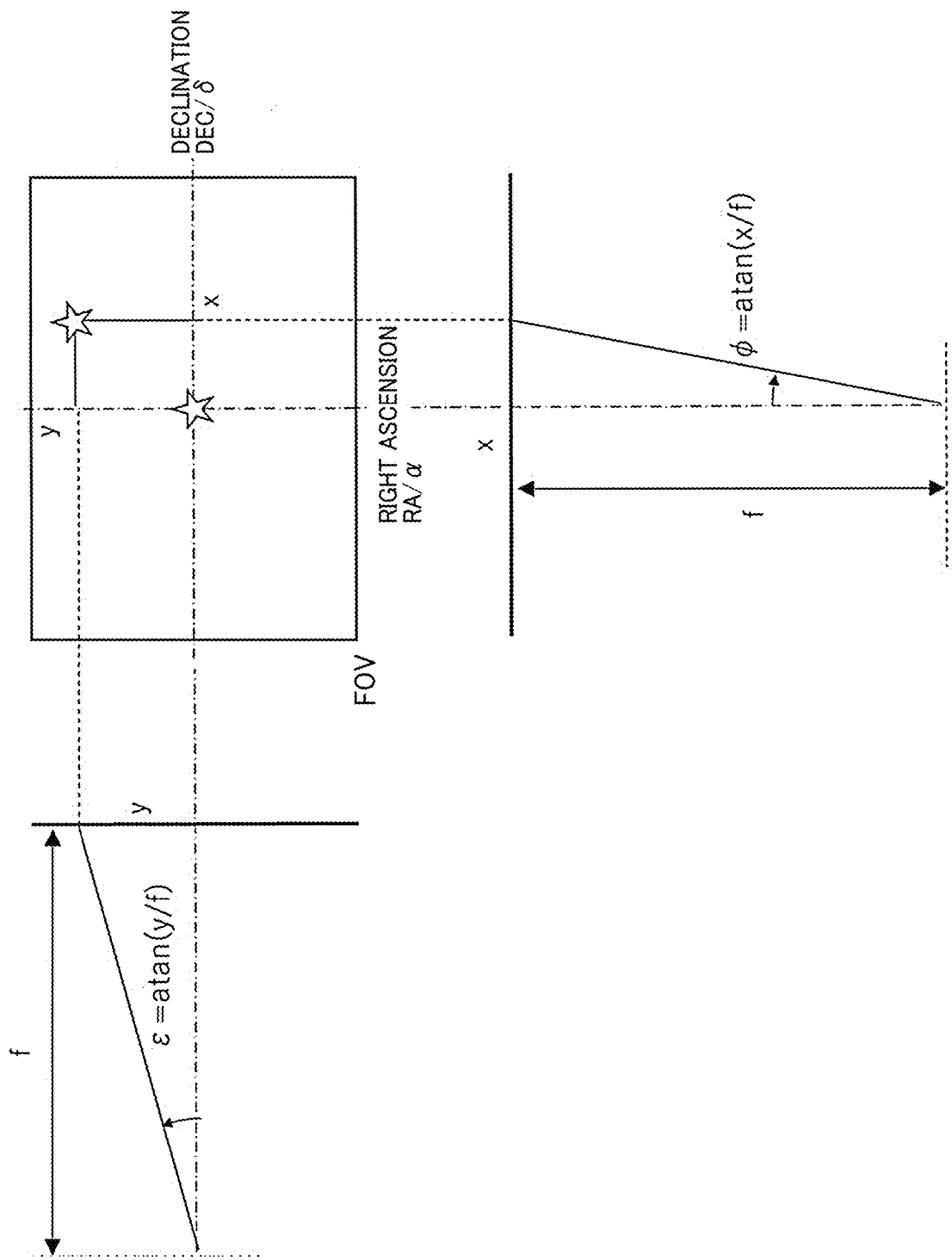
FIG. 10 is still another conceptual diagram illustrating a movement of a celestial object.

FIG. 10 is still another concept diagram of the movement of a celestial object. As illustrated in FIG. 10, using the known values f, x, and y in the FOV represented by the right ascension (RA/α) and the declination (DEC/δ), the following equations are established: ε=a tan(y/f), and φ=a tan(x/f).

The calculation method satisfying "y=f tan θ" in the image-capturing lens according to at least one embodiment is described above, with reference to FIGS. 8 to 10. However, the calculation method is to be modified according to the projection system of a lens including a fisheye lens.

Further, as typical lenses cause distortion and fail to fully satisfy "y=f tan θ", a slight deviation might be obtained in the calculation.

To obtain more accurate results, the deviation of the calculation may be corrected to correct the distortion of a lens, or an image that has undergone the correction of distortion may be used for detection.

Figure 11:
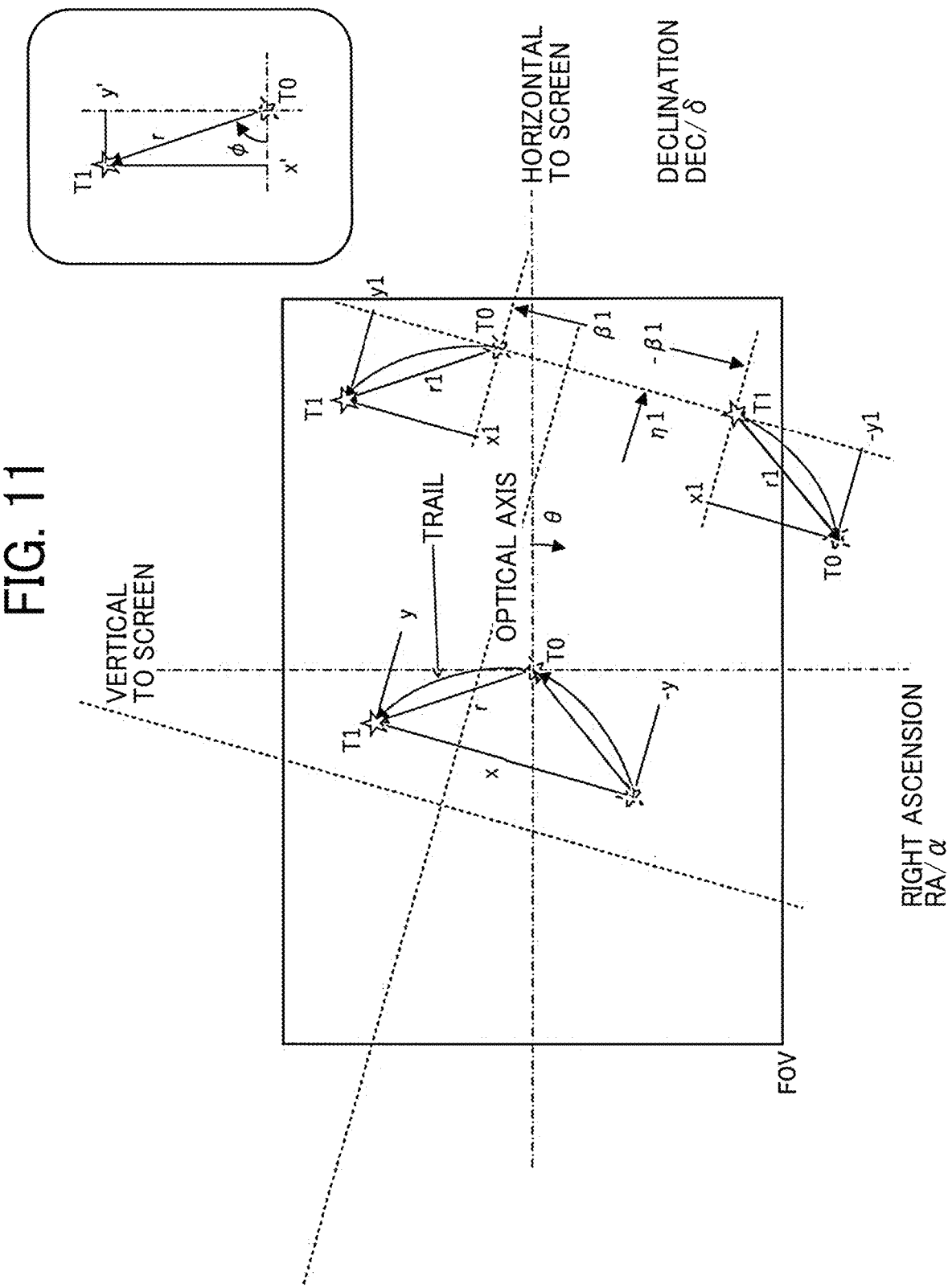
FIG. 11 is an illustration of a tilt of a screen.
Figure 12:
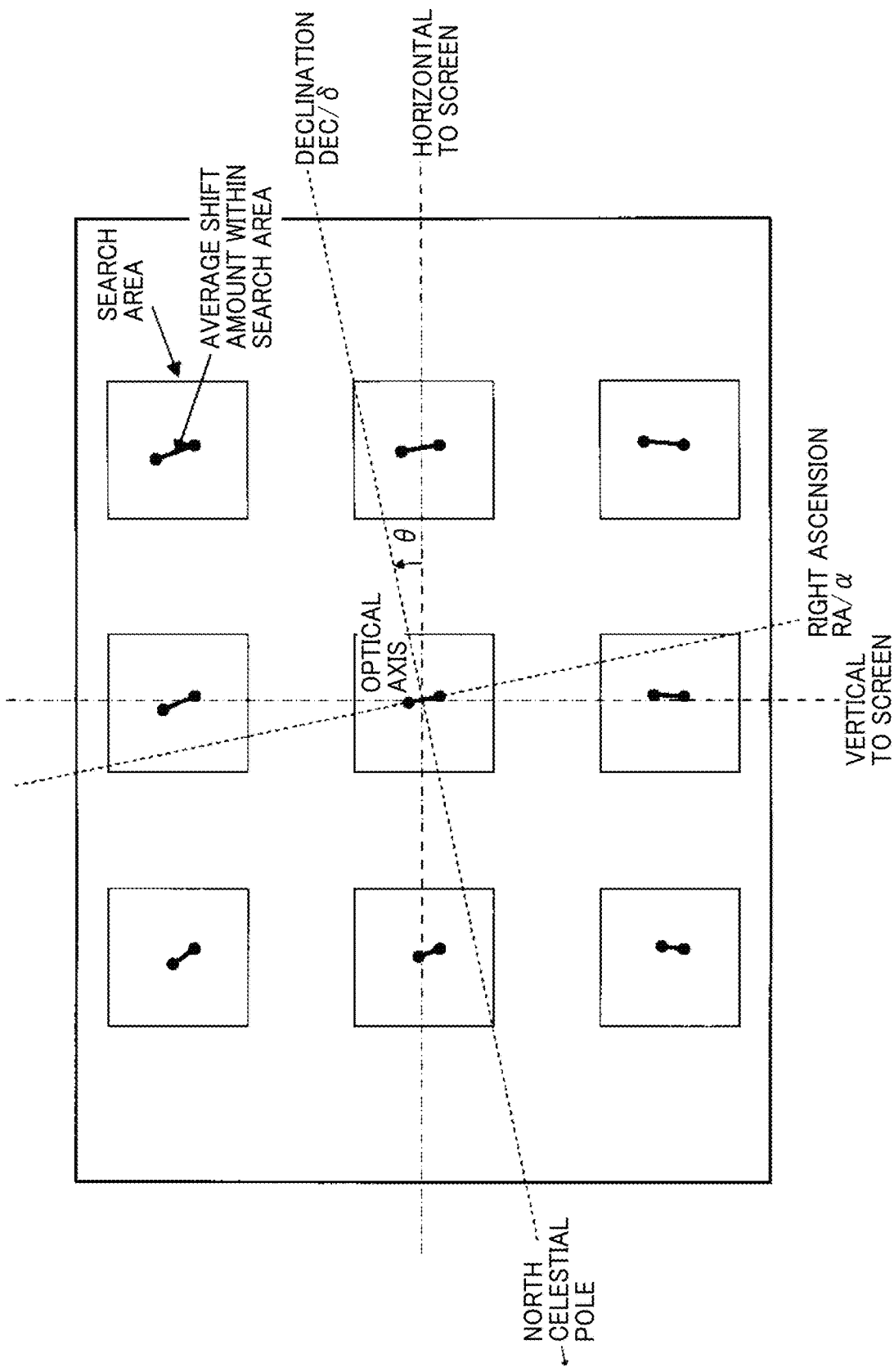
FIG. 12 is another illustration of a tilt of the screen.

FIGS. 11 and 12 are illustrations of the tilt of the screen according to different embodiments of the present disclosure.

FIG. 11 is an illustration of the tilt of the regular screen, and FIG. 12 is an illustration of the tilt of the screen for the SAD. When the screen of the digital camera 10 is tilted, the celestial object moves symmetrically about the declination (i.e., the optical axis).

For the tilt of the screen of the digital camera 10, the direction of declination is perpendicular to the vector of the amount of movement calculated at the center of the screen.

As described above with reference to FIGS. 7 to 12, the analyzer 21B obtains the latitude information (i.e., information including the latitude or the direction of the declination of the celestial object in which the digital camera 10 is facing), and the tilt information (i.e., information on the angle formed by the horizontal axis or vertical axis of the digital camera 10 and the direction of the right ascension), using the amount of movement of the celestial object obtained from the preliminary images.

Using the analytical results of the analyzer 21B, the computation unit 21C calculates tracking-control information used to track a celestial object and capture an image of the celestial object while adjusting the image sensor 13 with the movement of the celestial object that is being tracked.

The computation unit 21C calculates the tracking-control information, using at least one of the latitude information (i.e., information including the latitude or the direction of the declination of the celestial object in which the digital camera 10 is facing), and the tilt information (i.e., information on the angle formed by the horizontal axis or vertical axis of the digital camera 10 and the direction of the right ascension) obtained by the analyzer 21B.

The computation unit 21C calculates the tracking-control information, using the focal-length information f of the image-capturing optical system L, the time interval between the image-capturing times of the preliminary images or the exposure time, the latitude information (i.e., information including the latitude or the direction of the declination of the celestial object in which the digital camera 10 is facing), and the tilt information (i.e., information on the angle formed by the horizontal axis or vertical axis of the digital camera 10 and the direction of the right ascension).

The tracking-control information obtained by the computation unit 21C includes the X-direction drive speed dX/dt that is data used to move the image sensor 13 in the X-axis direction, the Y-direction drive speed dY/dt that is data used to move the image sensor 13 in the Y-axis direction, and the rotation-direction drive speed dθ/dt that is data used to move the image sensor 13 in the rotation direction.

In accordance with the tracking-control information including dX/dt, dY/dt, and dθ/dt obtained by the computation unit 21C, the tracking-capturing unit 21D automatically tracks the celestial object and captures an image of the celestial object with a long exposure time while adjusting the image sensor 13 with the movement of the celestial object that is being tracked.

In the automatic celestial-object tracking and capturing mode, the tracking-capturing unit 21D renders the image of the celestial object stationary with respect to the imaging surface 14 of the image sensor 13.

The tracking-control information, which is a combination of any of the X-direction drive speed dX/dt, the Y-direction drive speed dY/dt, and the rotation-direction drive speed dθ/dt, obtained by the computation unit 21C enables a celestial object to be automatically tracked and captured with higher accuracy.

The tracking-capturing unit 21D automatically captures an image of a celestial object that is being tracked in cooperation with the image-capturing optical system L and the image sensor 13. In other words, the image-capturing optical system L and the image sensor 13 implement the pre-capturing unit 21A under the control of the CPU 21. For example, the CPU 21 controls the image-capturing optical system L to capture one or more preliminary images.

An exposure time during the operation of capturing an image of a target celestial object that is being tracked (i.e., the automatic celestial-object tracking and capturing operation) by the tracking-capturing unit 21D may be set longer than an exposure time for each of a plurality of preliminary images captured by the pre-capturing unit 21A. For example, the celestial object that is being tracked is captured with a long exposure time, and a plurality of preliminary images is captured with different shorter exposure times.

An exposure time for one image and an exposure time interval between the image-capturing times of a plurality of images captured during the operation of capturing a target celestial object that is being tracked (i.e., the automatic celestial-object tracking and capturing operation) by the tracking-capturing unit 21D each may be set longer than an exposure time for each of a plurality of preliminary images, an exposure time interval between the image-capturing times of the plurality of preliminary images, or an exposure time for one preliminary image captured by the pre-capturing unit 21A. For, example, the celestial object that is being tracked is captured with a long exposure time, and a plurality of preliminary images is captured with different shorter exposure times.

The calculation of the tracking-control information including dX/dt, dY/dt, and dθ/dt and the adjustment of the image sensor 13 in accordance with the tracking-control information are performed with known methods, and these are not described in detail.

Figure 13:
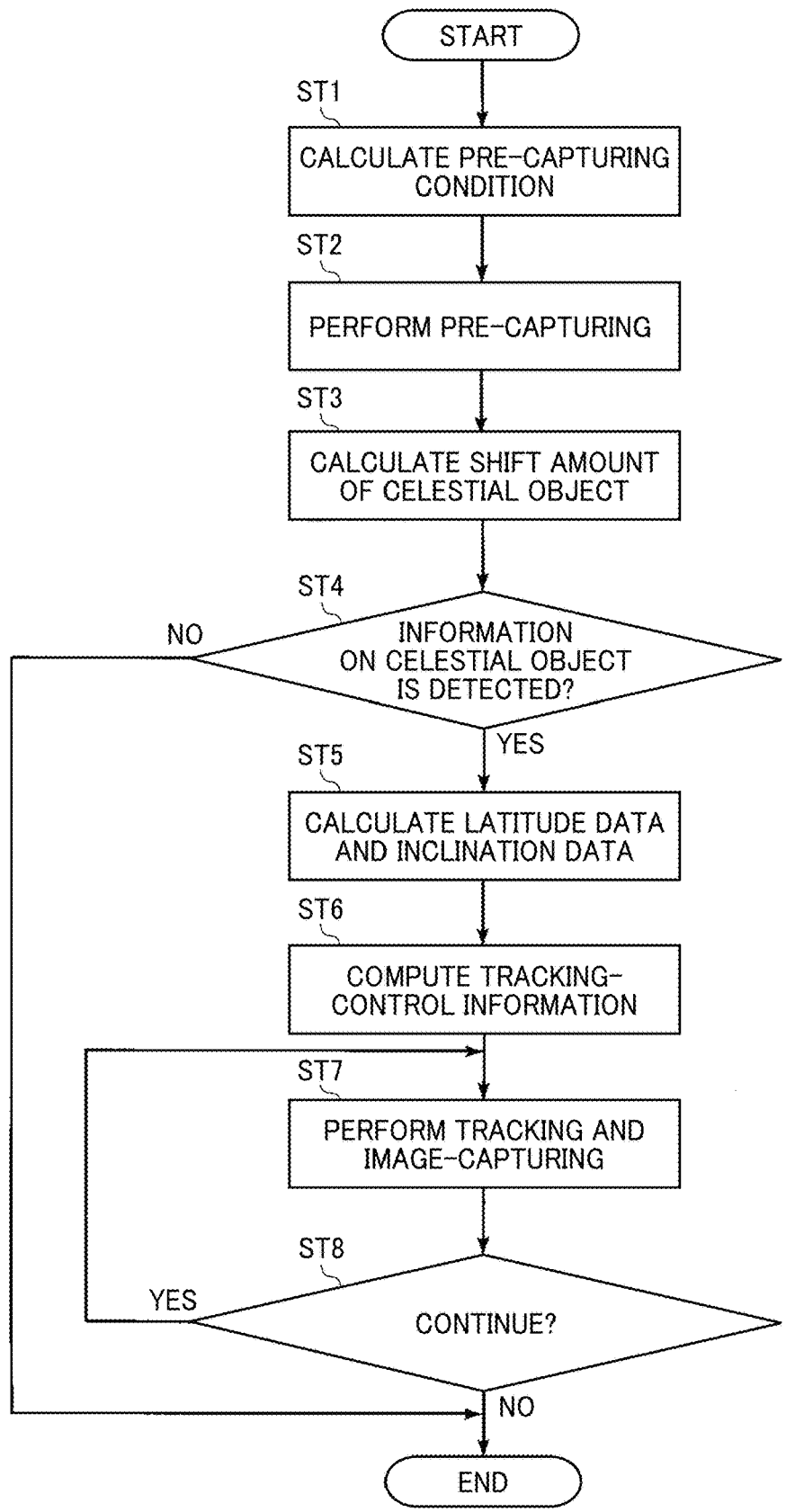
FIG. 13 is a flowchart of an image-capturing process of a digital camera, according to an embodiment.

FIG. 13 is a flowchart of an image-capturing process of the digital camera 10, according to an embodiment.

The image-capturing process starts when the automatic celestial-object tracking and capturing mode is selected through the setup switch 30, and the release switch 28 is pressed.

In step ST1, the CPU 21 automatically calculates the conditions for a preliminary image-capturing operation. The conditions for preliminary image-capturing operation depends on the focal length f of the image-capturing optical system L.

In step ST2, the pre-capturing unit 21A captures a plurality of preliminary images including a celestial object to be tracked during nonoperation of the image sensor 13 using the image-sensor-drive unit 15. In this case, at least two preliminary images are captured with a short exposure time interval.

In step ST3, the analyzer 21B calculates the amount of movement of the celestial object in the plurality of images captured by the pre-capturing unit 21A. In this case, the amount of movement includes concept including the direction of movement.

In step ST4, the analyzer 21B determines whether the information on the celestial object to be tracked has been detected. In other words, the analyzer 21B determines whether the celestial object to be tracked has been detected from the preliminary images, and when determining that the celestial object has been detected, the analyzer 21B determines whether the amount of movement has been calculated.

When the analyzer 21B determines that information on the celestial object to be tracked has been detected (YES in step ST4), the process proceeds to step ST5. When the analyzer 21B determines that information on the celestial object to be tracked has not been detected (NO in step ST4), the CPU 21 determines that an error has occurred and ends the process.

In step ST5, the analyzer 21B calculates the latitude information (i.e., information including the latitude or the direction of the declination of the celestial object in which the digital camera 10 is facing), and the tilt information (i.e., information on the angle formed by the horizontal axis or vertical axis of the digital camera 10 and the direction of the right ascension), using the amount of movement of the celestial object in the preliminary images calculated in step ST3. The calculation process in step ST5 uses the focal-length information f of the image-capturing optical system L, and the time interval between the image-capturing times of the plurality of preliminary images or the exposure time of one preliminary image captured.

In step ST6, using the latitude information (i.e., information including the latitude or the direction of the declination of the celestial object in which the digital camera 10 is facing), and the tilt information (i.e., information on the angle formed by the horizontal axis or vertical axis of the digital camera 10 and the direction of the right ascension), the computation unit 21C calculates tracking-control information including dX/dt, dY/dt, and dθ/dt to be used for tracking the celestial object and capturing an image of the celestial object while adjusting the image sensor 13 with the movement of the celestial object.

In step ST7, in accordance with the tracking-control information including dX/dt, dY/dt, and dθ/dt obtained by the computation unit 21C, the tracking-capturing unit 21D automatically tracks the celestial object and captures an image of the celestial object with a long exposure time while adjusting the image sensor 13 with the movement of the celestial object that is being tracked. In other words, the tracking-capturing unit 21D renders an image of the celestial object stationary with respect to the imaging surface 14 of the image sensor 13 during the tracking and capturing operation (i.e., the automatic celestial-object tracking and capturing mode).

In step ST8, the tracking-capturing unit 21D determines whether to continue the process.

The process in step ST8 makes an affirmative determination (YES in step ST8) when the focal length f of the image-capturing optical system L and the direction in the digital camera 10 is facing remain unchanged (i.e., the digital camera 10 is not moved), and makes a negative determination (NO in step ST8) in cases other than such a case. Alternatively, when the tracking and capturing operation (i.e., the automatic celestial-object tracking and capturing mode) during a predetermined time interval is completed, the tracking-capturing unit 21D determines to continue the process.

Alternatively, a user (i.e., a photographer) selects Continue. In other cases, it is determined that the process is to be continued. When the tracking-capturing unit 21D determines to continue the process (YES in ST8), the process returns to step ST7 to continue the tracking and capturing operation (i.e., the automatic celestial-object tracking and capturing mode).

When the tracking-capturing unit 21D determines not to continue the process (NO in ST8), the process ends.

As described above, the digital camera 10 according to an embodiment includes: a pre-capturing unit 21A that captures a plurality of preliminary images including a celestial object to be tracked; an analyzer 21B that analyzes the plurality of preliminary images, a computation unit 21C that calculates the tracking-control information (dX/dt, dY/dt, and dθ/dt) using the analytical results of the analyzer 21B, and a tracking-capturing unit 21D that tracks the celestial object and captures an image of the celestial object while adjusting at least one of the image-capturing optical system L and the image-capturing optical system L, in accordance with the tracking-control information (dX/dt, dY/dt, and dθ/dt).

This configuration enables an automatic tracking and capturing operation in a desirable manner using a simple structure.

Numerous additional modifications and variations are possible in light of the above teachings. It is therefore to be understood that within the scope of the appended claims, the present disclosure may be practiced otherwise than as specifically described herein. For example, elements and/or features of different illustrative embodiments may be combined with each other and/or substituted for each other within the scope of this disclosure and appended claims.

In the above embodiment, the size, shape, capability, and the like of each component illustrated in the accompanying drawings are not limited thereto, and can be appropriately changed within the range in which the effects that the embodiments of the present disclosure exhibit.

In the above-described embodiment, the cases where a celestial object to be tracked virtually moves relative to the image-capturing device (the digital camera 10) because of its diurnal motion are described. This is only one example, and any object that moves relative to the image-capturing device (i.e., the image plane of the image sensor) during a long exposure time may be a target object to be tracked.

In the above embodiments, the image-capturing device and the image-capturing method that automatically tracks a celestial object and captures an image of the celestial object are described. The embodiments of the present disclosure are applicable to an electronic device (e.g., an image-capturing assistance personal computers (PCs) for assisting the automatic celestial-object tracking and capturing operation of the image-capturing device and its image-capturing method.

The electronic device is connected to the image-capturing device, and may be designed to include an analyzer that analyzes the preliminary images including a target celestial object, and a computation unit that calculates tracking-control information used to track and capture the celestial object while adjusting at least one of the image-capturing optical system and the image sensor.

In the above-described embodiments, the cases where the image-capturing device that performs the automatic celestial-object tracking and capturing operation are described. Alternatively, the present embodiments are applicable in an image-capturing system including the image-capturing device and a stand (e.g., the stand 10X as a tripod illustrated in FIG. 3) mounted with the image-capturing device.

The image-capturing system includes a pre-capturing unit that captures a preliminary image including a celestial object to be tracked, an analyzer that analyzes the preliminary image, a computation unit that calculates tracking-control information using the analytical results of the analyzer, and a tracking-capturing unit that tracks and captures the celestial object while adjusting the stand with the movement of the celestial object, in the image-capturing device or the stand.

Figure 14:
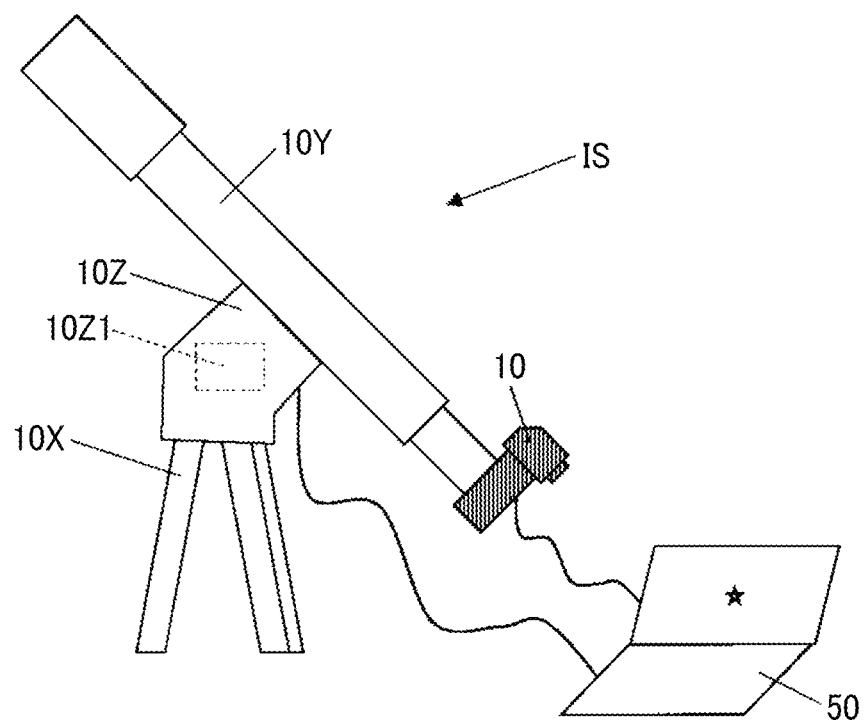
FIG. 14 is an illustration of the external appearance of an image-capturing system according to an embodiment.

FIG. 14 is an illustration of the external appearance of the image-capturing system IS according to an embodiment. The image-capturing method performed by the image-capturing system IS is implemented by predetermined processes of the components of the image-capturing system IS.

The image-capturing system IS includes a tripodal (i.e., a stand 10X) and a digital camera 10 (the image-capturing device). The digital camera 10 is supported by a telescope 10Y (primary mirror). The tripod (the stand 10X) includes a base 10Z supporting the telescope 10Y.

The base 10Z incorporates a drive unit 10Z1 close to the tripod and configured to move the telescope 10Y supporting the digital camera 10 toward a direction different from the direction of the optical axis LO of the image-capturing optical system L of the digital camera 10, for example, within a plane perpendicular to the optical axis LO.

The drive unit 10Z1 of the base 10Z enables the adjustment of the telescope 10Y, or the digital camera 10, to achieve the automatic celestial-object tracking and capturing operation, at any time including when the image sensor 13 of the digital camera 10 is not driven by the image-sensor-drive unit 15 and when the image-sensor-drive unit 15 is not included in the digital camera 10.

In this case, adjusting the telescope 10Y, or the digital camera 10, on the tripod (i.e., the stand 10X) by the drive unit 10Z1 is equivalent to adjusting at least one of the image-capturing optical system L and the image sensor 13 of the digital camera 10.

As illustrated in FIG. 14, the digital camera 10 and the tripod (i.e., the stand 10X) with the base 10Z may be connected to a PC 50 for computation of datasets to be used for the automatic tracking and capturing operation according to an embodiment of the present disclosure.

The image-capturing system IS according to an embodiment has the functional configuration as illustrated in FIG. 2 in which the CPU 21 of the digital camera 10 implements the capabilities of the pre-capturing unit 21A, the analyzer 21B, the computation unit 21C, and the tracking-capturing unit 21D. In this case, the digital camera 10 (an image-capturing device) is communicably connected to the tripod (i.e., the stand 10X).

In some examples, a set of the tripod (i.e., the stand 10X) and the base 10Z may include its CPU to implement a part or the entirety of the capabilities of the pre-capturing unit 21A, the analyzer 21B, the computation unit 21C, and the tracking-capturing unit 21D.

In some other examples where the PC 50 is used, the PC 50 implements a part or the entirety of the capabilities of the pre-capturing unit 21A, the analyzer 21B, the computation unit 21C, and the tracking-capturing unit 21D.

The above-described embodiments are given assuming that the image sensor is moved in the direction perpendicular to the optical axis (i.e., the direction different from the directions of the optical axis) with the movement of the celestial object to be tracked, in accordance with the tracking-control information, so as to perform the automatic celestial-object tracking and capturing operation.

In some examples, a part or all of the lenses of the image-capturing optical system L, or the entirety of the image-capturing device may be moved in the direction perpendicular to the optical axis (i.e., the direction different from the directions of the optical axis), instead of moving the image sensor 13.

Moving (adjusting) the entirety of the image-capturing device in the direction perpendicular to the optical axis (i.e., the direction different from the directions of the optical axis) is equivalent to adjusting the telescope 10Y, or the digital camera 10 on the tripod (i.e., the stand 10X) by using the drive unit 10Z1. In other words, at least one of the image-capturing optical system L and the image sensor 13 is adjusted with the movement of the celestial object that is being tracked, in accordance with the tracking-control information, so as to perform the tracking and capturing of the celestial object.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image-capturing device comprising:
   an image-capturing optical system;
   an image sensor; and
   processing circuitry configured to:
   control the image-capturing optical system to capture one or more preliminary images of an object to be tracked;
   analyze the one or more preliminary images;
   calculate tracking-control information using results of the analysis; and
   adjust at least one of the image-capturing optical system and the image sensor with movement of the object, in accordance with the tracking-control information to capture an image of the object that is being tracked.

2. The image-capturing device according to claim 1, wherein the processing circuitry is further configured to:
   obtain latitude information using the one or more preliminary images; and
   calculate the tracking-control information using the latitude information.

3. The image-capturing device according to claim 1, wherein the processing circuitry is further configured to:
   obtain latitude information and tilt information using the one or more preliminary images; and
   calculate the tracking-control information using the latitude information and the tilt information.

4. The image-capturing device according to claim 3, wherein the processing circuitry is further configured to calculate the tracking-control information, using the latitude information, the tilt information, a focal length of the image-capturing optical system, and a time interval between image-capturing times of the one or more preliminary images in a case that the one or more preliminary images include a plurality of preliminary images.

5. The image-capturing device according to claim 3, wherein the processing circuitry is further configured to calculate the tracking-control information, using the latitude information, the tilt information, a focal length of the image-capturing optical system, and an exposure time for the one or more preliminary images in a case that the one or more preliminary images include a single preliminary image.

6. The image-capturing device according to claim 1, wherein the processing circuitry is configured to analyze an amount of movement of the object in the one or more preliminary images.

7. The image-capturing device according to claim 1, wherein the processing circuitry is further configured to render an image of the object captured by the image-capturing optical system stationary with respect to an imaging surface of the image sensor to capture an image of the object that is being tracked.

8. The image-capturing device according to claim 1, wherein the one or more preliminary images include a plurality of images, and
wherein the processing circuitry is configured to capture each of the plurality of preliminary images with the same exposure time.

9. The image-capturing device according to claim 1, wherein the one or more preliminary images include a plurality of images, and
wherein an exposure time to capture an image of the object that is being tracked is longer than an exposure time for each of the plurality of preliminary images.

10. The image-capturing device according to claim 1 wherein an exposure time to capture an image of the object that is being tracked is longer than an exposure time for the one or more preliminary images in a case that the one or more preliminary images include a single preliminary image.

11. The image-capturing device according to claim 1 wherein an exposure time to capture an image of the object that is being tracked is longer than an exposure time interval between image-capturing times of the one or more preliminary images in a case that the one or more preliminary images include a plurality of preliminary images.

12. The image-capturing device according to claim 1 wherein the object is a celestial object virtually moving relative to the image-capturing device because of diurnal motion.

13. The image-capturing device according to claim 1,
wherein the image-capturing device has a tracking and capturing mode to capture an image of the object that is being tracked, and
wherein the image-capturing device further comprises a switch to switch on or off the tracking and capturing mode.

14. The image-capturing device according to claim 1,
wherein the image-capturing device has a tracking and capturing mode to capture an image of the object that is being tracked, and
wherein the image-capturing device further comprises a display to display whether the tracking and capturing mode is ON or OFF.

15. An image capturing method comprising:
controlling an image-capturing optical system of an image-capturing device to capture one or more preliminary images of an object to be tracked;
analyzing the one or more preliminary images captured by the image-capturing optical system;
calculating tracking-control information using analytical results of the analyzing; and
adjusting at least one of the image-capturing optical system and an image sensor of the image-capturing device with movement of the object, in accordance with the tracking-control information to capture an image of the object that is being tracked.

16. An image-capturing system comprising:
an image-capturing device including:
an image-capturing optical system configured to capture one or more preliminary images;
an image sensor; and
processing circuitry configured to:
    control the image-capturing system to capture one or more preliminary images of an object to be tracked;
    analyze the one or more preliminary images; and
    calculate tracking-control information using results of the analysis; and
a stand mounted with and communicably connected to the image-capturing device, the stand configured to move in accordance with the tracking-control information,
wherein the image-capturing system captures an image of the object that is being tracked.

17. An electronic device comprising:
processing circuitry configured to:
analyze one or more preliminary images of an object to be tracked, captured by an image-capturing device; and
calculate tracking-control information using results of the analysis, used to adjust at least one of an image-capturing optical system and an image sensor of the image-capturing device with movement of the object.

* * * * *